(No Model.)
W. A. STERN.
ELECTRIC METER.
No. 375,392. Patented Dec. 27, 1887.
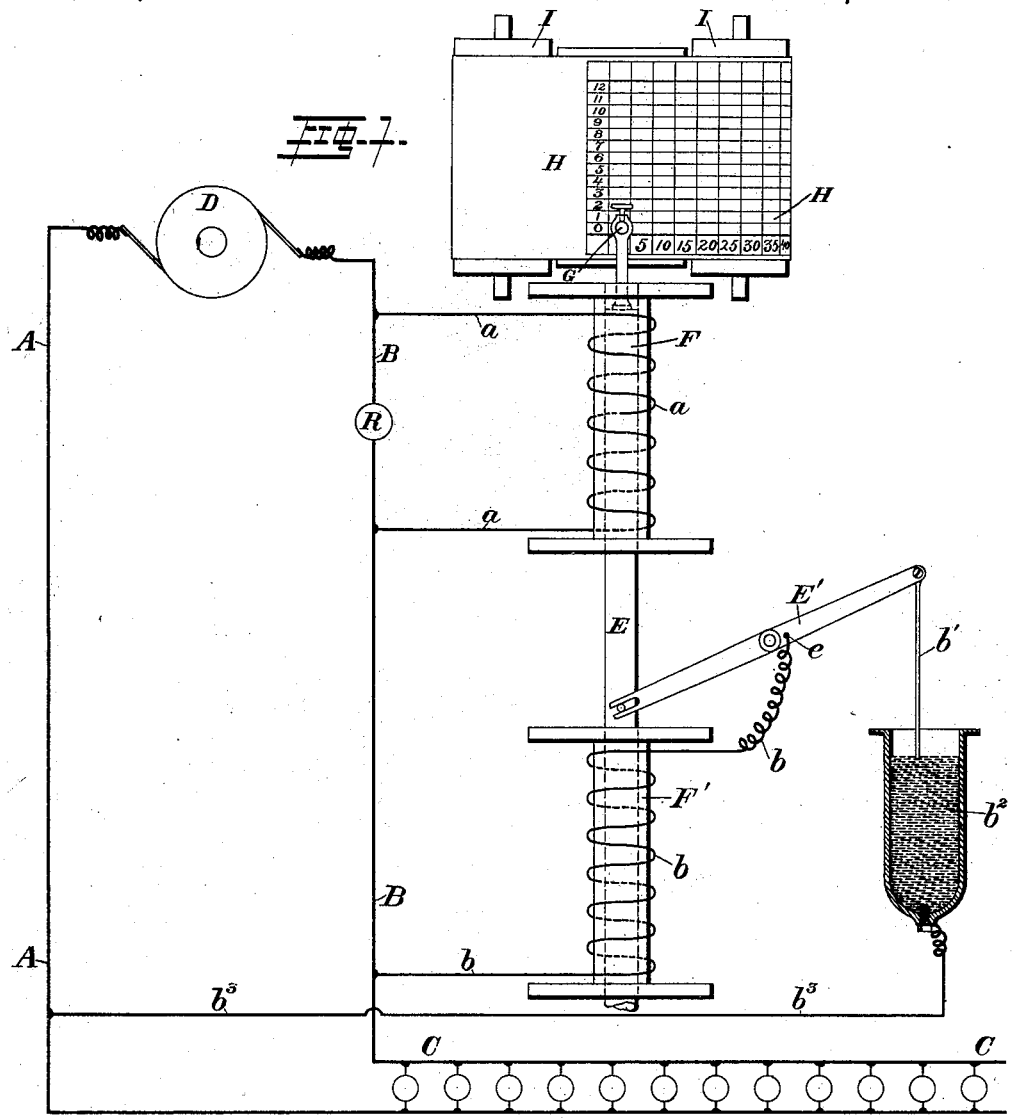
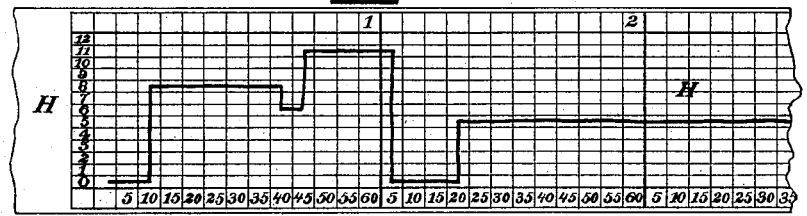
WITNESSES.
H. L. Gill
J. K. Smith
INVENTOR.
William A. Stern
by W. Bakewell & Sons
his Attorneys
N. PETERS, Photo-Lithographer, Washington, D. C.

UNITED STATES PATENT OFFICE.

WILLIAM A. STERN, OF ALLEGHENY CITY, PENNSYLVANIA.

ELECTRIC METER.

SPECIFICATION forming part of Letters Patent No. 375,392, dated December 27, 1887.

Application filed June 18, 1887. Serial No. 241,700. (No model.)

*To all whom it may concern:*

Be it known that I, WILLIAM A. STERN, of Allegheny City, in the county of Allegheny and State of Pennsylvania, have invented a new and useful Improvement in Electric Meters and Registers; and I do hereby declare the following to be a full, clear, and exact description thereof.

The object of my invention is to provide apparatus for indicating and registering the quantity and duration of electric currents in systems of electric lighting, &c. The devices which have been heretofore used for this purpose have been of two general types, one of which types was constructed on the principle of a magnet in circuit which would attract its armature in a ratio proportional to the strength of current, and the other constructed on the principle of the electrolytic deposition of metal in solution. In the first type the difficulty has been that, because the effect of the current on the magnet was not directly proportional to the strength of the current, various correcting devices and complicated mechanism had to be used. In the other style of meter there is a general difficulty that the device is unreliable, because absolutely pure metallic solutions cannot be had, and there is the special objection that it cannot be used with alternating currents, because they neutralize the effect of each other.

It is the object of my invention to overcome these objections in prior apparatus and to provide a meter and register in which the motion of the recording-instrument is directly proportional to the strength of the current, so that if a fixed quantity of current moves the instrument through a given distance any multiple of that quantity will move the instrument through a correspondingly greater distance in a direct ratio.

My object is, further, to provide a meter in which a record can be had of alternating currents, as well as of direct or continuous currents. I accomplish these ends by the use of the differential action of electro-magnets—*e. g.*, two spools or bobbins which pull in opposite directions on a core or armature which acts upon the recording-instrument and operates it. With such an arrangement a movement of the armature or core in any case is that which is caused by the difference in strength of the currents passing through the two coils, and when the forces of these currents are equal they neutralize each other and have no effect on the core or armature. In my apparatus I employ such magnets and connect one coil with the main line of the lighting-circuit, and the other coil is in circuit with a variable-resistance device. It is arranged so that if the current is used in the lamps or translating devices it passes through the main conductor and one of the coils to the lamp and back again, and at the same time a branch or subdivision of the current passes through the other coil, (not provided with the resistance device,) and by reason of the difference in the currents the armature or core will be moved until the resistance has been varied so as to make the difference between the currents just sufficient to hold the armature or core stationary. The resistance device is arranged so that the motion of the armature or core is directly proportioned to the change of current produced thereby, so that the instrument may be read without trouble or need of correction. The soft-iron armature is not affected by the rapid changes in direction of alternating currents, and is therefore operated by them in the same manner as if the current were continuous.

The foregoing is a general description of my apparatus. Of course to place the coils of the magnet directly in line of the main conductor would not in all cases be economical, because it might take as much electrical energy to measure and record the current as it would to satisfy the translating devices, and for this reason I set the instrument in a shunt-circuit, so that it shall work in a ratio of part of the strength of current employed. The ultimate result is the same, and this arrangement is more economical.

The recording-instrument which I employ is preferably a stylus or pencil moved by the armature or core in contact with a traveling tablet or strip of paper, so that the instrument shall record the number of lamps in use at any moment and the duration of time in which they are so used.

My invention is illustrated in the accompanying drawings, in which—

Figure 1 is a side view of the apparatus, showing the lamp-circuit and the helices of the magnet in diagram, and Fig. 2 is a plan view of the tablet or paper which I use to record the motions of the instrument.

Like symbols of reference indicate like parts in each.

In the drawings, A and B are the main conductors of an electric-lighting circuit.

D is the dynamo or source of the current, and C is a group of lamps electrically connected with the conductors in multiple arc.

F and F' are electro-magnets having a common armature, E, on which they pull in opposite directions, the pull of magnet F being upward and that of F' downward. The magnet F is wound with a coil, $a$, both ends of which are connected to the line-conductor B, and between these connections there is interposed a resistance, R, which determines the amount of current shunted through the magnet F. A strip, $b'$, of carbon or other material of high resistance, which moves within a cup, $b^2$, of mercury, is connected with the armature or core E by a lever, E', so that as the armature or core rises the strip will sink within the mercury, and vice versa, and the end of the coil $b$ of the magnet F' is attached to the lever E' at $e$, so as to be in electrical connection with the strip $b'$. The mercury in the cup $b$ is connected by a wire, $b^3$, with the main conductor A, and the primary end of the coil $b$ is connected with the conductor B, and the coil is therefore in parallel with the lamps.

G is a stylus which is attached to and moves with the magnet-core E in contact with a strip, H, of paper, which is moved by driven rollers I transversely to the line of motion of the core. The paper is divided by vertical and horizontal lines, as shown in Fig. 2, the horizontal lines forming a scale for measuring the degree of vertical motion of the armature, and the vertical lines forming a scale for measuring the length of time between the instants when different points of the paper are opposite to the stylus.

The rollers I may be driven by clock-work, by weights, by electricity, or by any other force which will give to the paper a regular and uniform rate of motion.

The operation is as follows: When none of the lamps C are in use and no current is passing through the conductors A and B, the magnet-core E remains at its lowest position, with the strip $b'$ raised as far as possible out of the mercury-cup $b^2$. When any of the lamps in the group are turned on—say one lamp—the current through the two coils $a$ and $b$ of the magnet being different in amount, the preponderance of current passing through the coil $a$, in which there is no resistance but that of its own winding, will draw up the core E and the stylus until sufficient of the strip has been immersed in the mercury in the cup $b^2$ to make the resistance in the circuit of the coil $b$ (which will vary directly with the degree to which the strip is immersed in the mercury) equal to the resistance in the lamp-circuit, when the core will come to rest. In like manner, if another lamp be put in circuit, the difference in current through the coils caused thereby will raise the armature E, and will, through the motion of the strip $b'$, vary the resistance in the coil $b$ until an equilibrium is established. Each increase in the number of lamps put in circuit therefore raises the armature E by increasing the strength of pull of the magnet F over that of the magnet F', and, on the contrary, each decrease in the number of lamps in circuit, by diminishing the strength of pull of the magnet F', causes the magnet F to draw down the armature until sufficient resistance is put in the coil $b$ to equalize the strength of pull of the magnets. This differential action is not subject to variation by change in magnetic condition of the armature, and hence the instrument does not need repeated calibration and correction.

The indications of the instrument may be easily read, because, since the resistance of the strip $b'$ varies in a direct ratio according to the degree of its immersion and its resistance varies directly with the resistance of the lamp-circuit, and since the amount of current varies with the number of lamps in use, the degree of motion of the armature E will be directly proportioned to the number of lamps. Therefore if one lamp causes the motion of the armature through a space equal to one-tenth inch, putting another lamp in circuit will move it through an equal space, and so on. These vertical motions of the armature E cause the stylus G to make a vertical mark upon the strip of paper, H, and as the paper moves at a regular and predetermined rate of speed, in a direction transversely to the line of motion of the stylus, irregular marks are made on the paper, such as are shown in Fig. 2, the vertical lines indicating changes in the current, and the horizontal lines indicating the duration of time intervening between the changes. Thus the diagram shown in Fig. 2 indicates that for ten minutes no lamps were in use, when eight at one time were turned on and continued burning for thirty minutes, when all but six lamps were cut off for five minutes and then increased to eleven lamps for twenty minutes, when all the lamps were cut off for fifteen minutes, and at the end of that time five were lighted.

By reason of the fact that the variation of the resistance of the variable-resistance device which I employ is in direct ratio to the degree of motion of the armature or core of the magnet, the record made by the apparatus on the strip, H, of paper may be easily read without the necessity for calculation, and the degree of motion caused by the addition or cutting out of a lamp is always uniform, no matter what be the number of lamps already in circuit.

Instead of the mercury-cup and immersed strip, other forms of variable-resistance devices arranged to observe the direct proportion above noted may be used, and the apparatus may be otherwise varied in form and arrangement. For example, the coils $a$ and $b$ may be wound differentially on the same spool, and instead of putting the coil in a shunt-circuit it may be directly interposed in the main circuit, as indicated in the first part of this specification. These and other modifications are within the power of the skilled electrician, and may be made without departing from the principles of my invention.

The instrument may be used as an absolute volt or ampère meter as a substitute for the magnetic-needle galvanometers heretofore used for that purpose, and as such it is of great advantage, because the instrument is not variable, and does not need calibration and continual correction of reading. In this case the traveling strip of paper need not be used.

I claim—

A measuring device for systems of electrical distribution, wherein are lamps or other translating devices, which consists in the combination, with the electric circuit, of an armature operated by coils, one of which is in the main line or in a branch thereof, and the second coil is in parallel with the translating devices and in circuit with a variable-resistance device operated by the said electro-magnet, and an indicator operated by the motion of the armature or core, substantially as and for the purposes described.

In testimony whereof I have hereunto set my hand this 3d day of June, A. D. 1887.

WILLIAM A. STERN.

Witnesses:
   W. B. CORWIN,
   THOMAS W. BAKEWELL.